(12) United States Patent
Sirowitzki et al.

(10) Patent No.: US 6,244,174 B1
(45) Date of Patent: Jun. 12, 2001

(54) MAINTENANCE AND INSPECTION SYSTEM FOR A PRINTING MACHINE

(75) Inventors: Heiner Sirowitzki, Wiesbaden; Martin Schmitt-Kallenbach, Mühlheim; Hanns-Otto Haas; Bernd Lindner, both of Heusenstamm, all of (DE)

(73) Assignee: MAN Roland Druckmaschinen AG, Offenbach (DE)

(*) Notice: Subject to any disclaimer, the term of this patent is extended or adjusted under 35 U.S.C. 154(b) by 0 days.

(21) Appl. No.: 09/356,747

(22) Filed: Jul. 19, 1999

(30) Foreign Application Priority Data

Jul. 18, 1998 (DE) .................................... 198 32 453
Jul. 18, 1998 (DE) .................................... 298 12 844 U

(51) Int. Cl.⁷ .................................................. B41F 33/00
(52) U.S. Cl. ...................... 101/212; 101/483; 101/484; 340/825.06; 340/825.15
(58) Field of Search ..................... 101/483, 212, 101/181, 216, 219, 484; 340/825.06, 825.15, 825.18

(56) References Cited

U.S. PATENT DOCUMENTS

| | | | |
|---|---|---|---|
| 4,346,446 | * | 8/1982 | Erbstein et al. ............ 101/365 |
| 4,528,630 | * | 7/1985 | Sargent ......................... 364/469 |
| 4,701,757 | * | 10/1987 | Schuck et al. ............ 340/825.06 |
| 4,803,634 | * | 2/1989 | Ohno et al. .................. 364/478 |
| 4,965,497 | * | 10/1990 | Rodi et al. ................... 318/372 |
| 5,588,362 | * | 12/1996 | Sugiyama et al. ........... 101/218 |
| 5,615,609 | * | 4/1997 | Hill et al. .................... 101/183 |
| 5,743,184 | * | 4/1998 | Skudrzyk ..................... 101/181 |
| 5,778,791 | * | 7/1998 | Albus et al. ................. 101/483 |
| 5,802,978 | * | 9/1998 | Geissler et al. ............. 101/484 |
| 5,813,334 | | 9/1998 | Blanchard ..................... 101/217 |
| 5,865,120 | * | 2/1999 | Gross ............................ 101/483 |

FOREIGN PATENT DOCUMENTS

4137979 * 6/1993 (DE).

* cited by examiner

Primary Examiner—Daniel J. Colilla
(74) Attorney, Agent, or Firm—Keating & Bennett, LLP

(57) ABSTRACT

A maintenance and diagnostic system for a printing machine, preferably a sheet-fed offset printing machine, includes a control system having at least one computer and is connected to signal transmitters that are sensors and/or limit switches. The main drive and other drives of the printing machine are activated via the sensors and/or limit switches. The control system is operatively connected to a control-desk computer containing data on print jobs that are carried out. The control system is arranged to provide a diagnostic and inspection system for printing machines to be used for planning necessary maintenance work in advance to the greatest possible extent such that the downtimes of the printing machine required for maintenance work are minimized. The control system includes a maintenance and inspection computer which is operatively connected to the control system and to the control-desk computer. Signals can be recorded by the control system onto the maintenance and inspection computer. Also, signals sent by the printing machine drives and the signal transmitters are fed to the maintenance and inspection computer. The maintenance and inspection computer uses such signals to determine the condition of consumable materials, and variables representing the stress on and wear of printing machine components provided, and also to determine the times and the extent of appropriate maintenance measures based on such conditions and variables.

7 Claims, 2 Drawing Sheets

MAINTENANCE AND INSPECTION SYSTEM FOR A PRINTING MACHINE

BACKGROUND OF THE INVENTION

1. Field of the Invention

The present invention relates to a maintenance and inspection system for a printing machine, and more particularly, the present invention relates to a system for determining times and the extent of appropriate maintenance measures based on various conditions and variables.

2. Description of the Related Art

Printing machines, and in particular sheet-fed offset printing machines, have a large number of individual parts which have a limited lifetime or service life. Furthermore, specific operating media and consumable materials have to be replaced or renewed from time to time.

In the case of sheet-fed offset printing machines, the number of parts which are subject to wear is particularly high, because of the complexity of the sheet transport. The elements of the separating and traction suckers in the feeder, which are usually made of rubber, wear as a function of the type of printing materials transported, since rough paper reduces the tightness of the seal of the suction elements. The conveyor belts of the conveying table which performs the sheet transport between the feeder stack and the feed of the printing machine wear because they interact with the printing material, and also because of the tension necessary for their operation. Furthermore, components made of rubber or elastomers are prone to become hardened and break, depending on the time in use. As a result, such rubber or elastomer elements have to be replaced after specific times, irrespective of stress imposed thereon.

The grippers or gripper pads which perform sheet transport within and between the individual printing units are also subject to wear. This wear depends on the roughness of the printing materials being transported, and also on the number of sheet transports carried out and on the printing speed. Worn sheet grippers or gripper pads are recognizable by sheet transfers which cause register differences. Register differences of this type then have to be compensated for by time-consuming adjustment operations of the register of the printing units following such sheet transfers. During register correction operations of this type, reject prints are produced. The replacement of worn grippers or gripper pads and their adjustment is a time-consuming procedure which causes long downtimes of the machine.

There are also additional parts which become and materials which are consumed. For example, such additional parts and materials of a sheet-fed offset printing machine include rubber blankets in the individual printing units, lubricants in the gears of the main and of the secondary drives, the tips of metering elements which interact with rotating rolls, the lubricants, in particular for the gripper mechanisms, and also lubricants for other moving parts in the cylinders and the transfer and driving belts such as toothed and V belts.

In order to avoid production failures which are caused by the sudden failure of such parts, and the resultant relatively long downtimes of the machine during production, it is necessary for the printing machine and its corresponding elements to be maintained regularly so that worn elements are replaced and consumable materials replenished regularly. Because of the large number of elements subject to wear, as well as the varying service lives of various elements and consumable materials (depending on the time or the operation cycle), machine manufacturers, in conjunction with the manufacturers of the respective components, define maintenance intervals which have to be complied with unconditionally. However, even strict compliance with the maintenance intervals and the implementation of the replacement or repair measures required is no guarantee against sudden production failures. The reason for this is in the wear relationship between specific elements and the type of production carried out, for example, the type of printing materials used, the inks used for printing and further production conditions (printing speed, frequency. of printing interruptions and the like).

The necessary maintenance intervals for specific elements (for example V belts or toothed belts) can also be lengthened considerably, given regular monitoring of specific parameters and their correction. The regular monitoring of the tension of a toothed belt/V belt increases the service life thereof so that the time when a time-consuming replacement operation is performed can be delayed considerably. The quality of consumable materials, such as the gear oil or the rubber blankets in the individual printing units, for example, also has a significant effect on the necessary maintenance and inspection intervals of the corresponding components. The use of a cheap but lower-quality oil, in conjunction with the production conditions during its use, under certain circumstances makes more frequent oil changing necessary than the use of a higher quality lubricant. In this case, the type of rubber blankets used has a strong dependence on the type of printing materials used.

In order to cope with the above-described difficulties, maintenance and inspection systems used in motor vehicles are considered. In such systems, the frequency of the maintenance work to be carried out (inspection intervals) is determined from sensor data from the engine, the gearbox, the chassis and the bodywork, in conjunction with prescribed data. The necessary inspection intervals are thus not only fixedly related to the time or the mileage but also as a function of the stress prevailing during the operation of the vehicle. It is therefore possible for an inspection interval defined to be distinctly longer as a result of frequent travel over long distances and under not too high a stress than is the case over frequent short journeys over the same number of miles, which stress the material more significantly. However, these maintenance and inspection systems take no account at all of the planned purposes for which the vehicle will be used in the future.

In the case of printing machines, it is known to monitor specific components additionally for wear or consumption. Examples of this are monitoring the level of containers providing operating materials, such as oil supply, damping solution, ink, powder and the like. Furthermore, in printing machines, it is known to monitor the temperature of cylinder bearings by using sensors, since an abnormal temperature/time behavior is indicative of anticipated damage. It is also possible for the tension of V-belt drives to be monitored by recording the slippage and an appropriate error signal is generated if the slippage values are too high.

Monitoring and diagnostic systems are also known in the field of printing machine electronics. Using an additional sensor system, for example, the degree of wear of contacts (brushes) of the commutators of DC motors can be monitored. In this case, however, error signals are only generated when the contacts/brushes have worn beyond a specific extent. Preventive maintenance measures cannot be generated by such a system.

In order to provide the gripper systems on the rotating cylinders with lubricant, it is necessary to open guard elements on the machine (folding catwalks, sliding guards and the like), and to move the machine into a specific position by moving in very small increments. Movement of the machine to the specific position is achieved by a machine control system generating specific control commands and feeding these control commands to the main drive of the machine. If the printing machine has a rotary encoder (absolute rotary encoder, incremental encoder), it is also possible to require permanently programmed (maintenance) positions, which are moved to automatically when triggered manually.

In particular, moving automatically to specific positions makes it easier for the operating personnel to carry out the appropriate work, but the operating personnel must comply strictly with the sequence of the individual operations, in order to avoid damage to the machine as a result of collision between moving parts and so on. When carrying out adjustment work, it is also necessary to carry out specific operations in a predefined order one after another. If damage to the machine occurs, then it is often not possible to determine the cause or the triggering event, since it is not possible to rule out that the operating or maintenance personnel have not carried out the corresponding maintenance work in accordance with the instructions or required sequence of operations.

In the case of maintenance work which requires performance of a large number of steps, it is also not possible to rule out specific operations being carried out in a working sequence which differs from that required, since specific machine positions (moving to the position) are omitted as a result. The operating or maintenance personnel are often not aware that, although the same machine position has been assumed, a maintenance operation necessitating a different machine position must have been carried out previously. Missing moving operations for machine positions in this way, and thus changing the operating sequence, can likewise not be detected subsequently, so that if faults or damage to the machine occur, the cause cannot be established, and any repair/fault correction measures which arise are very complicated.

DE 43 27 848 C2 discloses a monitoring device for a printing machine in which the signals from individual limit switches/sensors or other signal transmitters of guard elements/emergency-off push-buttons are evaluated in conjunction with the rotational speed of cylinder achieved by the drive of the printing machine. When the guards are open, the machine must run only at a maximum possible permissible rotational speed, which is determined by the monitoring device recording the signals from the sensors, limit switches and push-buttons. This monitoring device also generates the maximum possible permissible rotational speed. If it is established that there is a difference between the current rotational speed of the machine (of the drive) which is actually run and the highest possible permissible rotational speed determined by the monitoring device, then the drive is brought to a standstill and an electromagnetically operated brake is applied. However, this monitoring device does not permit the subsequent implementation of maintenance work.

SUMMARY OF THE INVENTION

In order to overcome the many problems and disadvantages described above, preferred embodiments of the present invention provide a diagnostic and inspection system for printing machines which allow for planning of necessary maintenance work in advance to the greatest possible extent and which minimize the downtimes of the machine required for such maintenance work.

According to preferred embodiments of the present invention, a maintenance computer is provided which is connected to a control system of the printing machine and to a control-desk computer of the printing machine. The maintenance computer records the previous and future production data/production planning data, and determines the current state of the machine and of the machine components in conjunction with the conditions during previous production runs and the planning for future jobs. The maintenance and inspection computer according to preferred embodiments of the invention, records, via the machine control system, signals and data from sensors and signal transmitters monitoring the individual components within the machine. Furthermore, the maintenance and inspection computer is fed, via the machine control system, with data relating to print jobs carried out, for example, regarding the extent of the edition, paper grade, printing material thickness, maximum and average printing speed and other conditions. Information concerning various elements/consumable materials which are subject to wear or, respectively, consumption, are stored in the maintenance and inspection computer in a memory area specifically provided for such data.

On the basis of the sensor signals, in conjunction with the information relating to print jobs previously carried out, it is possible to derive information about the degree of wear of specific machine components. It is thus possible to derive information about the degree of wear of the rubber parts of the separating and traction suckers in the feeder of the printing machine from the number of previously printed sheets, in conjunction with the printing material grade, the paper weight and the average and maximum printing speed of previous print jobs.

According to preferred embodiments of the present invention, data about print jobs previously carried out are fed to the maintenance and inspection computer. The number of stops occurring during print jobs already carried out can additionally be evaluated by the maintenance and inspection computer according to preferred embodiments of the present invention, in order to determine a measure of wear of the separating and traction suckers. It is thus possible for the maintenance and inspection computer to establish whether the frequency of misfed sheets/missing sheets on the feeder of the printing machine increases with a higher number of sheets (interrogate sheet counter). For this purpose, the signal from a sheet controller on the feeder and, if appropriate, from further sensors is evaluated by the maintenance and inspection computer.

In a similar way, the maintenance and inspection computer carries out, for example, the monitoring of the rubber blankets in the individual printing units of a sheet-fed offset printing machine. The rubber blankets are also subject to wear, which results from direct stress imparted by the printing material and from reducing or changing compressibility. In order to determine a measure of wear for the rubber blankets and to provide evidence for any necessary blanket change, the maintenance and inspection computer records and evaluates the total number of sheets already printed, in conjunction with the printing speed, the paper grade, the printing material thickness and the printing pressure adjustments respectively selected. For this purpose, the maintenance and inspection computer is supplied with the appropriate signals for the respective remotely controllable actuating drives via the machine control system.

A large number of sensor signals recorded in the machine are fed to the maintenance and inspection computer according to preferred embodiments of the present invention. In particular, the signals are from temperature sensors in the individual machine components, such as, in particular, temperature values from rolls or cylinder bearings. From these temperature values, in conjunction with the further production data input via the control desk of the printing machine (printing material grade, type and number of colors to be printed, printing pressure adjustments and so on), it is then possible to determine information about the bearing wear or about the quality of the lubricant. Furthermore, it is possible to decide in this way whether an increased bearing temperature is present because of bearing wear or reduced lubricant quality or because of specific print-job properties (high pressure adjustment or high tackiness of the ink).

The maintenance and inspection computer according to preferred embodiments of the present invention does not merely carry out individual monitoring of the various components of the printing machine. Instead, the data recorded in the manner described above are used to derive an overall picture of the various components of the machine. Then based on all of this information, the maintenance and inspection computer determines the time and the extent of the next maintenance work (inspection). For this purpose, according to preferred embodiments of the present invention, not only is information relating to print jobs which have already been carried out taken into account, but also information relating to production planning (future print jobs) is considered. It is thus possible to carry out a maintenance process determined by the maintenance and inspection computer after one or more planned relatively small print jobs, since on the basis of the information recorded during the planning, increased stress on the corresponding components is prevented.

Furthermore, the maintenance and inspection computer according to preferred embodiments of the present invention permits the greatest possible concentration of maintenance work. As a result of the individual generation of wear information relating to the large number of machine components, it is possible to indicate to the operator of the machine, via the control desk of the printing machine or via a higher-order recording computer (print-room control system), that certain maintenance measures must be carried out at a specific time. The apparatus of the present invention therefore does not provide merely a once-defined maintenance catalogue after specific time intervals or numbers of sheets which is output for use in performing maintenance on the printing machine. Instead, the extent and the type of the necessary maintenance work is defined using the respective production conditions (history of the machine) in conjunction with the planned, future print jobs.

One advantage of the maintenance and inspection computer according to preferred embodiments of the present invention thus resides in the fact that the maintenance intervals are not derived exclusively from the operating hours and/or sheet counter of the printing machine, but the overall state of the machine is recorded and assessed, in order to generate dynamic maintenance intervals and to minimize the necessary downtimes of the machine needed for the maintenance work based on this information.

Furthermore, maintenance work which is carried out is automatically detected to the greatest possible extent and is monitored and recorded with regard to its execution. Furthermore, the maintenance and inspection computer according to preferred embodiments of the present invention is additionally able to assess data which can be input via the control desk of the printing machine and have an effect on the ability to make the maintenance intervals more dynamic. For example, the type and quality of the lubricants used are monitored and assessed and, additional assessments (visual inspection) of the wear of suckers or of other rubber parts, and so on are performed.

According to preferred embodiments of the present invention, the maintenance and inspection computer not only records an overall picture of the machine with regard to its degree of wear and the necessary maintenance work, but the maintenance and inspection computer also performs monitoring of the maintenance work which is necessary and to be carried out in each case. On the basis of the production data, in conjunction with the settings respectively made on the machine, it is possible for the maintenance and inspection computer to establish when the gripper systems and, in particular, the recto and verso printing gripper systems in the cylinders must be supplied with lubricant. This results from the evaluation of the total number of print jobs, and the number of print jobs using recto and verso printings. At the same time, the number of sheets printed in the respective operating mode is also taken into account. If, on the basis of production planning, the next print jobs are pure recto printed materials (no turning of the sheet), then the necessary lubricating measure for the recto and verso printing grippers can be delayed individually to the next maintenance interval (lubrication of the recto printing grippers). The downtime of the machine required by this maintenance measure is prolonged only insignificantly by this additional lubricating work, since the necessary manipulations on the machine (opening of catwalks, protective gratings and the like) and the positioning operations (moving to specific machine positions) have to be carried out in any case.

The monitoring of defined maintenance measures is carried out in a simple way by evaluating the signals from the machine control system in conjunction with the main drive of the printing machine. As previously indicated above, a large number of maintenance measures necessitate moving to specific positions, as well as opening specific protective gratings, folding catwalks and so on. The machine control system records the limit switches/sensors securing these devices and the machine control system also has an operative connection to the main drive of the printing machine, so that the operation of moving to predefined positions in conjunction with the opening of specific catwalks/protective gratings may be monitored by the maintenance and inspection computer.

The maintenance and inspection computer also takes into account data which can be input via the control desk of the printing machine and which data relate to the kind of lubricants used or the type of any replacement parts used. Thus, for the generation of a future maintenance schedule, it is possible to take into account the quality of the lubricant used or the service life of the replacement part used or of the consumable material used. The information needed for this is contained in a memory of the maintenance and inspection computer. It is also possible to provide in a preferred embodiment of the present invention, that this information is updated continuously (for example on line via a database) in the case of maintenance work carried out by a technical specialist or repair or maintenance personnel. Thus, for example, the approval of a new lubricant grade can be taken into account if this lubricant had not yet been approved at the time of the installation of the machine.

The advantages of the maintenance and inspection computer according to preferred embodiments of the present invention includes the fact that the machine control system primarily evaluates signals from sensors/limit switches which are already provided in the machine. Furthermore, the maintenance and inspection computer is supplied with the signals from the sheet counter, from the machine control system clock (real time), the control signals for the main drive of the printing machine and control signals for the other drives of the machine, adjustments to the ink control system performed during a print job, remote register adjustments and so on. A large number of variables relating to maintenance measures can be determined from this machine and job history. Thus, for example, from the frequency and the magnitude of adjustment operations of the ink feed, it is possible to determine whether adjustment (zero adjustment) of the ink slide is necessary. Furthermore, from the frequency of register adjustment operations, it is possible to determine whether the sheet grippers in or between the printing units are still operating satisfactorily and whether they are still in register alignment with each other.

Furthermore, the current demand of the main drive or other drives in the printing machine (feeder/deliverer), in conjunction with any temperature data accumulated, can be used to determine a measure of the state of lubrication of the respective gears. The maintenance and inspection computer according to preferred embodiments of the present invention is able to monitor specific machine components directly with regard to their state of wear and state of consumption. Such monitored items include elements of the machine which are monitored directly by sensors. Furthermore, the maintenance and inspection computer according to preferred embodiments of the present invention can also obtain indirect information about the degree of wear and tear of specific machine elements. Thus, on the basis of long-term observation of cylinder temperatures, it is possible to draw inferences about possible subsidence of the machine or of the machine foundation. Furthermore, the thermal stress on adjacent machine components can also be determined via the turn-on time (duration) of a dryer (IR dryer) drying out of bearing points as a result of the heat from the dryer.

Using the sensor system present in the machine, ranking of the possibility and plausibility of requested and indicated maintenance work is carried out in the manner already outlined above. A maintenance operation requested via the control desk of the printing machine is thus not only acknowledged manually by the person carrying it out, but it is also established, by interrogating appropriate signals in the machine control system, whether these maintenance measures were also actually carried out and, in particular, or can be carried out.

In addition to the automatic monitoring of requested maintenance work, however, the maintenance and inspection computer is also fed with information which can be input manually in order to form future maintenance intervals. Thus, provision can be made to classify the wear on replaceable elements (suckers/V belts and the like) in a specific acknowledgement menu. Such a classification can distinguish, for example, between "severely worn" and "wear hardly detectable". Taking such a classification into account is preferably done using quality data relating to the type of part used.

According to a preferred embodiment of the invention, a monitoring unit evaluates signals from the signal transmitters (limit switches, sensors) interacting with the guards/catwalks in conjunction with the signals from the main drive (from the control system upstream of the main drive) and in con-junction with the stored data, such that inferences and conclusions are drawn about the proper execution of maintenance work. Use is made of the fact that, for example, the lubrication of the gripper shaft of a sheet-conveying cylinder is carried out following the opening of a folding catwalk between the printing units, by moving to a specific position. After moving to this position, the machine will remain in this position for a specific time if the work is carried out properly. Only then is the folding catwalk closed and, if necessary, the machine moved to new positions.

Using the monitoring unit according to preferred embodiments of the present invention, a maintenance measure of this type is documented in a simple and reliable way and is also checked with regard to the state of proper execution. An operator inputs the appropriate measure to be carried out via the control desk of the printing machine, in a menu (maintenance menu) which can be called up specifically. The corresponding positions to be moved to and the signal waveforms to be produced by the limit switches of the protective devices to be opened/closed are stored in the monitoring unit. The monitoring unit then carries out the recording (waveform over time) of the corresponding signals for the main drive in order to move to the respectively required positions, as well as the waveforms of the signals from the signal transmitters of the protective devices.

In a preferred embodiment of the present invention, the monitoring unit records the signals described in the preceding paragraph. This information can. then be called up by authorized operating personnel in order to check whether specific maintenance measures have actually been carried out, and whether such measures were carried out properly. According to preferred embodiments of the present invention, as early as during the carrying out of the maintenance measures, comparison of the signals from the signal transmitters (guarding) in conjunction with the signals for the main drive of the printing machine and stored data are compared in order to indicate, in particular via the control desk of the printing machine, that a specific maintenance measure has been carried out correctly and that, after the maintenance measure has been carried out correctly, the next required maintenance measure is to be performed. The appropriate operating instructions (positioning of the machine, opening a specific protective device) can then be indicated via the monitor of the control desk.

According to preferred embodiments of the present invention, the monitoring unit has a signal connection to a timer (clock), so that specific operating states (moving to a specific position, residence time within this position, catwalk or sliding guard opened/closed) can be recorded and evaluated. These state times can also be compared with stored minimum times, this being based on a plausibility criterion to the effect that, if a specific maintenance operation is carried out properly (lubricating the bearings of a gripper shaft or carrying out a specific adjustment operation), the machine must remain in this position for a specific minimum time.

These and other features, advantages and elements of the present invention will be apparent from the following detailed description of the preferred embodiments with reference to the accompanying drawings as described below.

BRIEF DESCRIPTION OF THE DRAWING FIGURES

DETAILED DESCRIPTION OF PREFERRED EMBODIMENTS

Figure 1:
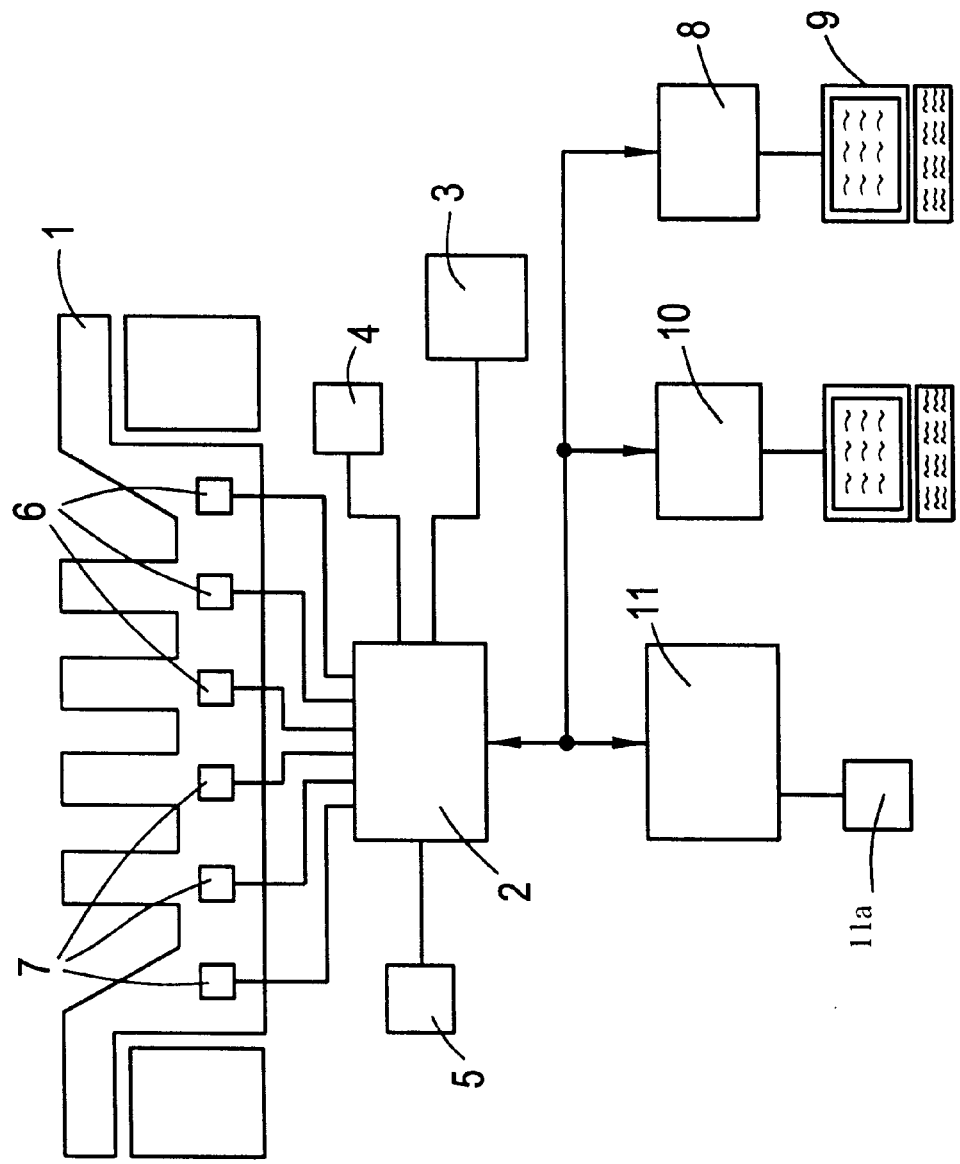
FIG. 1 shows a sheet-fed offset printing machine with a machine control system, an associated control-desk computer, a computer for production planning and monitoring, and a maintenance and inspection computer according to a preferred embodiment of the present invention.

Referring to FIG. 1, a printing machine 1 for a sheet-fed offset printing machine is illustrated. The printing machine includes a control system 2 which preferably includes one or more computers. The control system 2 has a signal connection to a main drive 3 of the printing machine 1, other drives 4, 5, sensors 6 arranged in the printing machine 1 and limit switches 7 assigned to the guards. The drives 4, 5 are, in particular, the drives in the feeder, deliverer of the printing machine 1 and, respectively, the remotely controllable actuating drives for the register and the ink feed (ink metering elements). The actuating commands for the main drive 3, the other drives 4, 5 and the signals from the sensors 6 and the limit switches 7 are recorded by the control system 2 of the printing machine 1, and the control system 2 initiates the sequences needed for the respective operating situation.

The control system 2 of the printing machine 1 has a signal connection to a control-desk computer 8 of a control desk 9 of the printing machine. Using an input device and a monitor of the control desk 9, specific data which can be called up via the control-desk computer 8 from the control system 2 of the printing machine 1 can be displayed and changed, and specific components of the printing machine 1 can also be operated remotely. The input of specific data, such as, in particular the printing material grade, format, number and type of colors used for printing, and so on, also takes place via the control desk 9. Furthermore, the control-desk computer desk 8 is used to store the information which can be recorded via the control system 2 of the printing machine 1 and relates to printing speed, number of sheets, number and size of register adjustment commands carried out during a print job, the number of actions on the ink feed and so on.

Furthermore, a computer 10 provided in the production planning/production control system has a signal connection to the control-desk computer 8 of the control desk 9 of the printing machine 1. Using this computer 10, which has a signal connection to other control-desk computers of printing machines which are not illustrated, the availability of the machine and the planning of print jobs to be carried out in the future are defined. This computer 10 may have a signal connection to further work stations in the printing works control system, via which adjustment data/presetting data relating to print jobs to be carried out in the future can be recorded.

The maintenance and inspection computer 11 according to this preferred embodiment of the present invention preferably has a direct signal connection to the control system 2 of the printing machine 1. Furthermore, the maintenance and inspection computer 11 has a connection via the network which connects the control system 2 to the control-desk computer 8. The control-desk computer 8 and the computer 10 of the production control system/planning are connected to one another by a network, so that the maintenance and inspection computer 11 according to this preferred embodiment of the present invention also has a signal connection to these devices.

As has already been explained above, a large number of data from the control system 2 are fed to the maintenance and inspection computer 11. These data may include, in particular, the actuating commands for the main drive 3 of the printing machine 1, actuating commands for the drives 4, 5 and signal states from the sensors 6 and the limit switches 7. These signals are documented by the maintenance and inspection computer for the purpose of determining necessary maintenance measures and information provided in a memory 11 is also taken into account for this purpose. These are in particular quality features of the widest possible range of elements in the printing machine.

The maintenance and inspection computer has a signal connection to the control-desk computer 8 of the control desk 9 of the printing machine 1, so that the extent of maintenance work which has been determined can be displayed via a maintenance menu, which can be displayed on the monitor of the control desk 9. Furthermore, the acknowledgement of maintenance operations which have been carried out also is performed by the control desk 9, the maintenance and inspection computer 11 additionally ranking the plausibility of a maintenance measure which has been carried out, using the signals from the sensors 6/the limit switches 7 in conjunction with the actuating commands of the drives 3, 4, 5.

According to preferred embodiments of the present invention, the maintenance and inspection computer 11 determines the necessity for maintenance measures of specific individual components in their entirety and in particular in conjunction with the information of planned print jobs to be carried out in the future. For this purpose, the maintenance and inspection computer 11 is additionally supplied with information from the computer 10 from job preparation/production planning.

Figure 2:
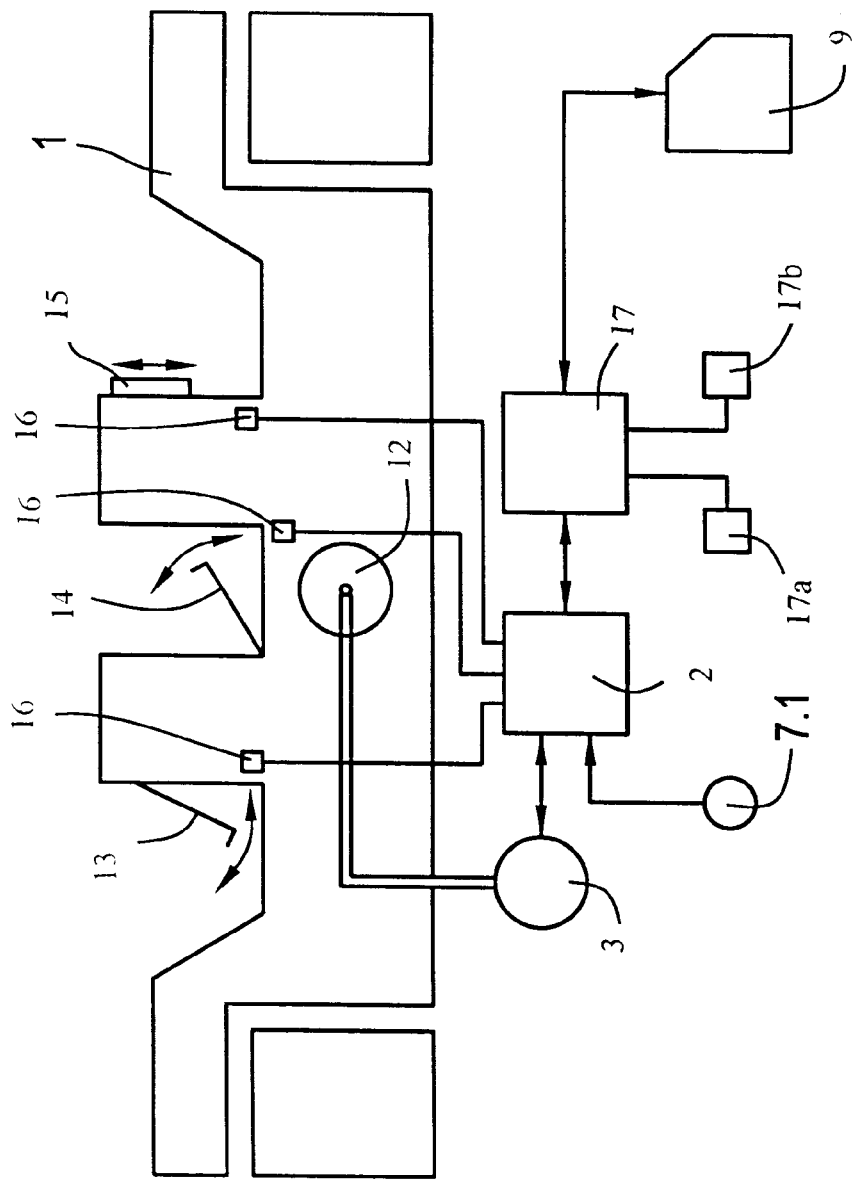
FIG. 2 shows a sheet-fed offset printing machine with signal transmitters assigned to the protective devices (indicated by way of example), a control system and the main drive of the machine.

Referring to FIG. 2, a sheet-fed offset printing machine 1, illustrated schematically, has a number of cylinders or drums. Only one cylinder 12 is illustrated in FIG. 2 for reasons of simplicity. Folding guards 13, 14, or sliding guards 15 are fitted between the printing units and/or on the front and rear sides of the individual printing units. These guards are equipped with signal transmitters 6 such as limit switches or sensors so that they can be interrogated electrically. The signals from the signal transmitters 16 are fed to the control system 2 of the printing machine 1 and, via these, to the monitoring unit 9.

The control system 2 of the printing machine 1 has a signal connection to the main drive 3, which is designed as a DC motor, for example, and which drives the drums and cylinders of the machine via a gear train (not illustrated) and/or a shaft. In particular, it is possible to move the machine to specific positions via push-buttons (operating elements) which are not illustrated but have a signal connection to the control system 2 of the printing machine 1. In order to move to specific positions, the control system 2 of the printing machine 1 has an operative connection to a rotary encoder 7.1.

If provision is made, for example, to provide the gripper devices (not illustrated) on the cylinder 12 with lubricant, then it is necessary to move the machine, and hence the cylinder 12, into a specific position, in such a way that the grippers on the cylinder 12 are accessible from above. After the machine has been moved to the appropriate position (generation of control commands by the control system 2), the folding catwalk 14 is opened, so that a signal can be detected via the monitoring unit 17 and the corresponding signal transmitter 16.

The monitoring unit 17 according to preferred embodiments of the present invention preferably has a signal connection to a clock 17a and to a memory 17b. The clock 17a may be the timer of the computer of the monitoring unit 17. In the memory 17b, in conjunction with the clock time of the corresponding maintenance measure, the measures performed in carrying it out (moving to the machine position, opening/closing the guards 13, 14, 15) are recorded. The monitoring unit 17 has an operative connection to the control desk 9 of the printing machine 1, so that, in a menu which can be called up by an authorized operator, the manipulations carried out at a specific time can be evaluated in conjunction with the respective time duration.

According to a preferred embodiment of the invention, the memory 17b is used to store machine positions (angular position values) to be moved to for specific maintenance measures, in conjunction with the protective devices (folding guards 13,14, sliding guards 15) to be opened or to be closed at the same time. The signals from the rotary encoder 7.1 can likewise be recorded by the monitoring unit 17 according to the preferred embodiments of the present invention, and are preferably compared in conjunction with reference positions provided in the memory 17b and relating to specific maintenance measures.

According to a preferred embodiment of the invention, provision is made for it to be possible to call up maintenance measures within a specific menu via the control desk 9 of the printing machine 1, in such a way that the manipulations to be performed can be indicated to the operator. At the same time, provision may be made that, after a first maintenance measure has been carried out (for example lubricating the gripper device of a cylinder/of a drum) and after the proper execution of this measure has been established, the maintenance measure to be performed subsequently is then indicated. The operating or service personnel are thus led through the maintenance work by the monitoring unit 17 in conjunction with instructions which can be displayed via a monitor on the control desk 9.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A maintenance and diagnostic system for a printing machine comprising:
   a control system which includes at least one computer, the control system being connected to signal transmitters that transmit signals of sensors that monitor operating elements of the printing machine and being operative to activate a main drive and auxiliary drives of the printing machine, the control system having an operative connection to a control-desk computer containing data for print jobs carried out;
   a maintenance and inspection computer having a signal connection to the control system and to the control-desk computer and receiving the signals recorded by the control system and supplied by the main and auxiliary drives and from the signal transmitters, the maintenance and inspection computer using the signals to determine a condition of consumable materials and variables representing the stress on and wear of printing machine operating elements, and based on such conditions, determining times and extent of printing machine maintenance measures necessary to prevent problems or defective conditions from occurring in the future;
   a monitoring unit arranged to receive signals from a rotary encoder fitted to the printing machine, and the monitoring unit having a memory in which positions of the printing machine recorded by the rotary encoder are stored in conjunction with signals which are recorded by the monitoring unit and are received from the printing machine operating elements and the signal transmitters; wherein
   the memory of the monitoring unit stores the positions of the printing machine recorded by the rotary encoder, the signals from the operating elements and the signal transmitters, in conjunction with the time signals from a clock; and
   the positions to which the printing machine is to be moved in relation to specific maintenance measures to be carried out, the positions of the operating elements and signal states from the signal transmitters are stored in the memory of the monitoring unit, and when a corresponding maintenance measure is performed, the monitoring unit evaluates and compares the stored signal states with the signals which are currently recorded, in conjunction with the time from the clock.

2. A maintenance and diagnostic system according to claim 1, wherein the maintenance and inspection computer has a signal connection to an additional computer containing print job information about print jobs planned for the printing machine, and the maintenance and inspection computer determines the times and the extent of the maintenance measures based on the print job information.

3. A maintenance and diagnostic system according to claim 1, wherein the maintenance and inspection computer monitors the maintenance measures to be carried out from the signals which are supplied to the control system from the main and auxiliary drives and the signal transmitters.

4. A maintenance and diagnostic system for printing machines according to claim 1, wherein the maintenance and inspection computer records and processes information which is input manually via the control-desk computer and refers to the maintenance measures carried out.

5. A maintenance and diagnostic system according to claim 1, wherein the monitoring unit has a signal connection to the control desk computer of the printing machine so as to receive data from the control desk concerning the conditions recorded therein.

6. A maintenance and diagnostic system according to claim 1, wherein the operations respectively to be performed in relation to a large number of maintenance measures to be carried out are stored in the memory of the monitoring unit, and the operation respectively to be performed is displayed via an indicator device.

7. A maintenance and diagnostics system according to claim 1, wherein the operations respectively to be performed in relation to a large number of maintenance measures to be carried out are stored in the memory of the monitoring unit, and monitoring unit approves an operation based on an operation previously carried out.

* * * * *